United States Patent
Simon et al.

(10) Patent No.: US 11,684,211 B2
(45) Date of Patent: Jun. 27, 2023

(54) GRIDDLE

(71) Applicant: Halo Products Group, LLC, Elizabethtown, KY (US)

(72) Inventors: Paul J. Simon, Elizabethtown, KY (US); Michael R. Giebel, Joplin, MO (US)

(73) Assignee: HALO PRODUCTS GROUP, LLC, Elizabethtown, KY (US)

( * ) Notice: Subject to any disclaimer, the term of this patent is extended or adjusted under 35 U.S.C. 154(b) by 0 days.

(21) Appl. No.: 17/702,346

(22) Filed: Mar. 23, 2022

(65) Prior Publication Data

US 2022/0304507 A1     Sep. 29, 2022

Related U.S. Application Data

(60) Provisional application No. 63/164,692, filed on Mar. 23, 2021.

(51) Int. Cl.
  *A47J 37/06*   (2006.01)
  *A47J 37/07*   (2006.01)

(52) U.S. Cl.
  CPC ......... *A47J 37/0713* (2013.01); *A47J 37/067* (2013.01); *A47J 37/0664* (2013.01); *A47J 37/0704* (2013.01); *A47J 37/0786* (2013.01)

(58) Field of Classification Search
  USPC ...................................................... 126/25 R
  See application file for complete search history.

(56) References Cited

U.S. PATENT DOCUMENTS

| | | | | |
|---|---|---|---|---|
| 3,455,290 A * | 7/1969 | Kemp | ..................... | F24C 15/10 |
| | | | | 126/214 R |
| 3,922,138 A * | 11/1975 | Biddle | ..................... | F24C 3/106 |
| | | | | 239/557 |
| 2013/0056663 A1* | 3/2013 | Cadeau | ................... | F23N 1/007 |
| | | | | 251/205 |
| 2018/0187885 A1* | 7/2018 | Manrique | ................ | F23D 14/20 |
| 2021/0270464 A1* | 9/2021 | Cowan | ..................... | F24C 3/126 |

* cited by examiner

*Primary Examiner* — Avinash A Savani
(74) *Attorney, Agent, or Firm* — Yohannan Law; David R Yohannan

(57) ABSTRACT

A griddle having a grease management system and independent cooking zones is disclosed. The griddle may have a cooking surface back wall with an opening provided therein for grease removal. A grease drip flange may extend away from the cooking surface at a downward angle at or near the back wall opening. A removable grease receptacle having a pivotable handle, as well as a squeegee element, may be provided below the grease drip flange. The independent cooking zones may be provided by burner assemblies having front and rear burners that provide different levels of heat using a single dual gas control valve.

7 Claims, 13 Drawing Sheets

SECTION A-A

GRIDDLE

CROSS-REFERENCE TO RELATED APPLICATIONS

This application claims the benefit of U.S. Provisional Application No. 63/164,692 filed Mar. 23, 2021, the disclosure of which is hereby incorporated by reference herein in its entirety.

FIELD OF THE INVENTION

Embodiments of the present invention relate to food cooking appliances.

BACKGROUND OF THE INVENTION

Outdoor cooking, and particularly the use of outdoor barbecue grills, smokers, and griddles, remains very popular. A number of different appliances are currently available to cook food outdoors. All such appliances include a cooking surface to support food items, and historically the most popular outdoor primary cooking surfaces have been grill surfaces. A grill surface typically includes spaced metal elements, such as rods, that support food items above a heat source and permit juices and grease to fall through the spaces between the spaced elements. A grill surface permits flames from some types of heat sources to come in direct contact with food items imparting a particular "flame cooked" flavor. Flame cooking results in grease dripping directly on to heating elements, such as propane burners, which in turn results in unwanted flare ups that can scorch the food in a matter of seconds. Thus, while the ability to flame cook a food item is sometimes desirable, it comes at a cost in terms of temperature control, grease management, and safety, among others.

Indeed, while professional kitchens may include a grill cooking surface, such kitchens nearly universally include a griddle cooking surface. Thus, there is no doubt that griddle cooking is desirable. Griddle cooking surfaces referred to herein include any cooking surfaces having a relatively flat, continuous, heated, normally metal, surface for supporting food. The primary difference between griddle surfaces and grill surfaces is that the former do not include spaced elements that permit direct contact between food and a heat source, such as a propane burner. As a consequence, griddle surfaces also do not permit grease to drip through the cooking surface to the heat source giving griddle surfaces an advantage in terms of temperature control, grease management, and safety due to the absence of any risk of flare ups.

Given the particular advantages of griddle cooking surfaces coupled with the increasing popularity of outdoor cooking, it is only natural that there is a need for well-designed and well-functioning outdoor griddles. Existing outdoor griddles, however, do have some disadvantages as currently designed. For example, existing outdoor griddles must include grease receptacles to collect grease that evolves from cooking foods. Typically, known grease collection receptacles are difficult to access to empty at the end of an outdoor cooking experience. Thus, there is a need for an outdoor griddle that incorporates a grease collection receptacle that is easy to access and use.

Grease receptacles on existing outdoor griddles also are typically placed in a location that does not permit a user to easily scape grease from her cooking utensils into the grease receptacle. Accordingly, there is a need for an outdoor griddle that includes a grease collection receptacle disposed in a location conducive to scraping grease from cooking utensils, and which includes a well-placed and convenient structure(s) to scrap grease from the utensils.

Exiting outdoor griddles, as well as embodiments of the present invention, can provide a relatively expansive cooking surface providing space to cook many different food items at the same time. For example, a griddle enthusiast may want to sear a steak in one zone of the griddle, slow cook sausages in another zone, brown hashed potatoes in a third zone, and provide a heat source for a pot to boil corn in a fourth zone. It may be desirable to further divide each of these cooking zones, if for example, some of the steak is to be cooked to a finished rare temperature and some to a medium well-done temperature, after searing is complete. It may also be desirable to have individual cooking zones of different sizes to accommodate different proportions of cooking food. Previously available outdoor griddles, however, have limited or no ability to provide individual cooking zones of different sizes that can maintain different temperatures. More particularly, available outdoor gas griddles have very limited ability to provide individual cooking zones of different sizes and that can maintain different temperatures. Accordingly, there is a need for an outdoor gas griddle that provides a large number of individual cooking zones of individually selectable sizes and individually selectable temperatures.

Existing outdoor gas griddles also do not adequately redirect heat generated by the heat source, such as a propane burner, to the griddle cooking surface. Accordingly, there is a need for an outdoor gas griddle that includes elements that redirect as much heat as possible to the griddle cooking surface.

OBJECTS OF THE INVENTION

Accordingly, it is an object of some, but not necessarily all embodiments of the present invention to provide an outdoor griddle that incorporates a grease collection receptacle that is easy to access and use.

It is also an object of some but not necessarily all embodiments of the present invention to provide an outdoor griddle that includes a grease collection receptacle disposed in a location conducive to scraping grease from cooking utensils, and that includes a well-placed and convenient structure(s) to scrap grease from the utensils.

It is also an object of some but not necessarily all embodiments of the present invention to provide an outdoor gas griddle that provides a large number of individual cooking zones of individually selectable sizes and individually selectable temperatures.

It is also an object of some but not necessarily all embodiments of the present invention to provide an outdoor gas griddle that includes elements that redirect as much heat as possible to the griddle cooking surface.

SUMMARY OF EMBODIMENTS OF THE INVENTION

Responsive to the foregoing challenges, Applicant has developed an innovative cooking griddle, comprising: a set of control knobs; a cooking surface; a cooking surface back wall extending in a first reference plane; a cooking surface back wall opening formed in the cooking surface back wall and coplanar with said first reference plane; and a grease drip flange having an upper most precipice at which said grease drip flange extends away from the cooking surface at a downward angle, wherein the grease drip flange upper most precipice and the set of control knobs are disposed on opposite sides of the first reference plane.

Applicant has further developed an innovative cooking griddle, comprising: a cooking surface; a cooking surface back wall extending in a first reference plane; a cooking surface back wall opening formed in the cooking surface back wall and coplanar with said first reference plane; a grease drip flange extending away from the cooking surface back wall opening at a downward angle; a grease receptacle; a hanger bracket pivotably attached to said grease receptacle; and a squeegee attached to the hanger bracket.

Applicant has still further developed an innovative cooking griddle, comprising: a plurality of control knobs; a plurality of dual gas valves, wherein each of the plurality of dual gas valves is operatively connected to, and associated with, a single one of each of the plurality of control knobs; a plurality of burner assemblies, wherein each of the plurality of burner assemblies is operatively connected to a single one of each of the plurality of dual gas valves, and wherein each of the plurality of burner assemblies comprises: a first gas input port communicating with a front venturi, which in turn communicates with a ring-shaped front burner; and a second gas input port communicating with a rear venturi, which in turn communicates with a ring-shaped rear burner, wherein each one of the plurality of control knobs and an associated one of the plurality of dual gas valves is configured to selectively provide a supply of gas for operating the ring-shaped front burner at multiple levels of preselected heat selected from the group consisting of low, medium and high heat, and a supply of gas for operating the ring-shaped rear burner at multiple levels of preselected heat selected from the group consisting of low, medium and high heat.

Applicant has still further developed an innovative cooking griddle, comprising: a flat continuous cooking surface; a plurality of control knobs provided adjacent to the cooking surface; a plurality of dual gas valves, wherein each of the plurality of dual gas valves is operatively connected to, and associated with, a single one of each of the plurality of control knobs; a plurality of burner assemblies, wherein each of the plurality of burner assemblies is operatively connected to a single one of each of the plurality of dual gas valves, and wherein each of the plurality of burner assemblies comprises: a first gas input port communicating with a front venturi, which in turn communicates with a ring-shaped front burner; and a second gas input port communicating with a rear venturi, which in turn communicates with a ring-shaped rear burner, wherein each one of the plurality of control knobs and an associated one of the plurality of dual gas valves is configured to simultaneously selectively provide a first supply of gas for operating the ring-shaped front burner and a second supply of gas for operating the ring-shaped rear burner at different levels of preselected heat selected from the group consisting of: a low level of heat, a medium level of heat, and a high level of heat.

Applicant has still further developed an innovative cooking griddle wherein: a ring-shaped front burner of each of a plurality of burner assemblies provides a first heating zone on a cooking surface, a ring-shaped rear burner of each of the plurality of burner assemblies provides a second heating zone on the cooking surface, and the griddle is configured to continuously provide different levels of heat for the first heating zone and the second heating zone.

Applicant has still further developed an innovative method of providing different levels of heat in a first heating zone on a cooking surface and in a second heating zone on the cooking surface, comprising the steps of: setting a first one of a plurality of control knobs at a first position so as to provide continuous supplies of gas to a ring-shaped front burner and a ring-shaped rear burner that are the same; and setting the first one of the plurality of control knobs at a second position so as to provide continuous supplies of gas to the ring-shaped front burner and the ring-shaped rear burner that are different.

Applicant has still further developed an innovative cooking griddle, comprising: a flat continuous cooking surface; a cooking surface wall extending upward and away from the cooking surface, said cooking surface wall having a hollow interior portion defined by an inner wall element and an outer wall element, wherein the inner wall element is proximal to the cooking surface and the outer wall element is distal from the cooking surface; a vent opening provided in the cooking surface wall inner wall element, said vent opening communicating with the hollow interior portion of the cooking surface wall; and a vent cover disposed around the vent opening, wherein the vent cover is configured to direct heated air from the vent opening towards the cooking surface.

It is to be understood that both the foregoing general description and the following detailed description are exemplary and explanatory only and are not restrictive of the invention as claimed.

BRIEF DESCRIPTION OF THE DRAWINGS

In order to assist the understanding of this invention, reference will now be made to the appended drawings, in which like reference characters refer to like elements. The drawings are exemplary only and should not be construed as limiting the invention.

DETAILED DESCRIPTION OF EMBODIMENTS OF THE INVENTION

Figure 1:
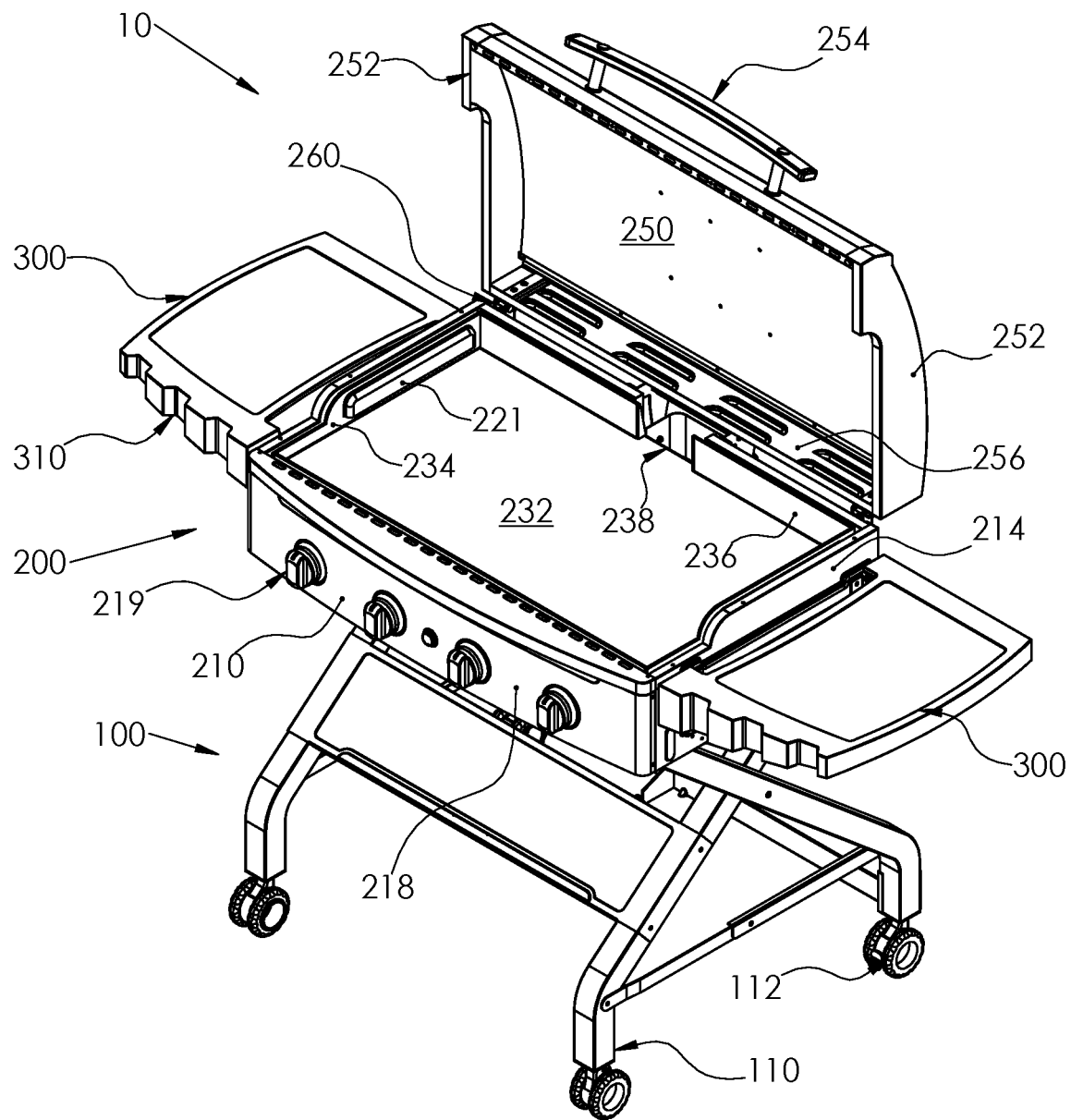
FIG. 1 is a perspective view of the front of an outdoor gas griddle in accordance with embodiments of the invention.
Figure 2:
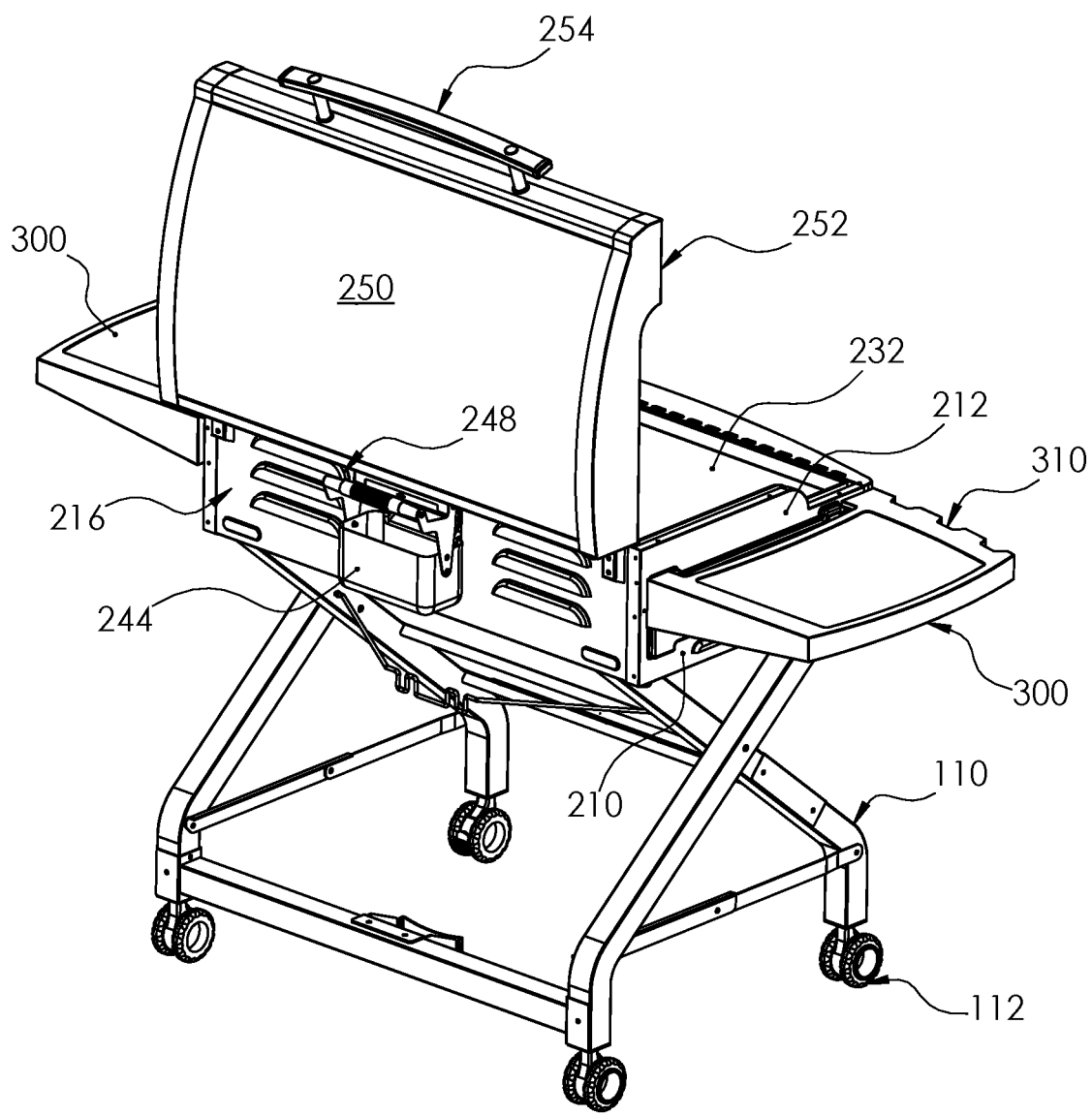
FIG. 2 is a perspective view of the back of an outdoor gas griddle in accordance with embodiments of the invention.
Figure 3:
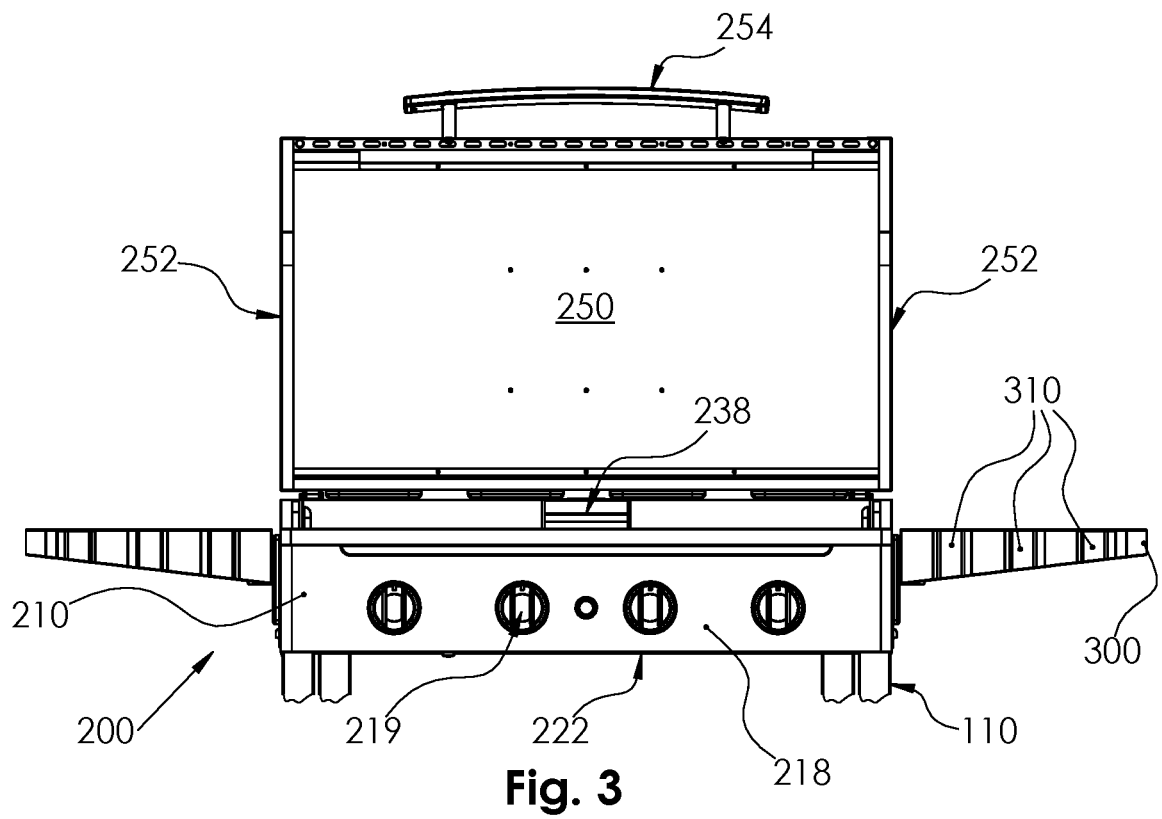
FIG. 3 is a front view of an upper portion of an outdoor gas griddle in accordance with embodiments of the invention.
Figure 4:
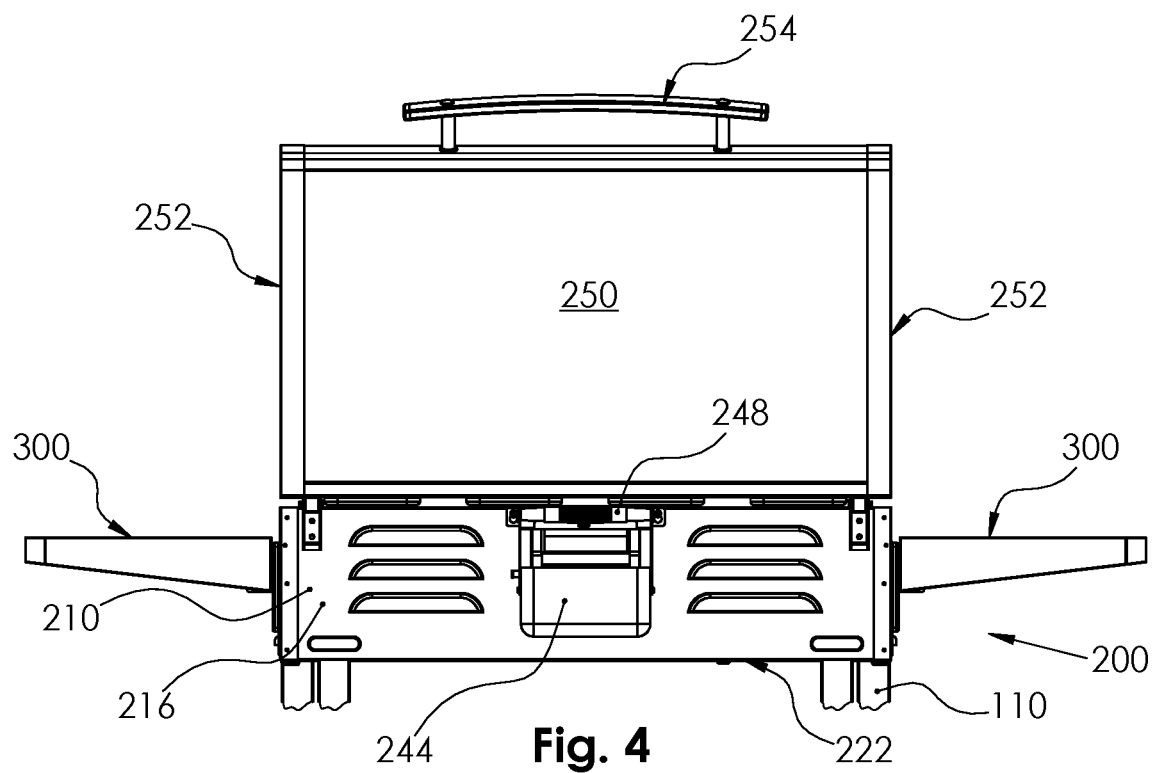
FIG. 4 is a back view of an upper portion of an outdoor gas griddle in accordance with embodiments of the invention.
Figure 5:
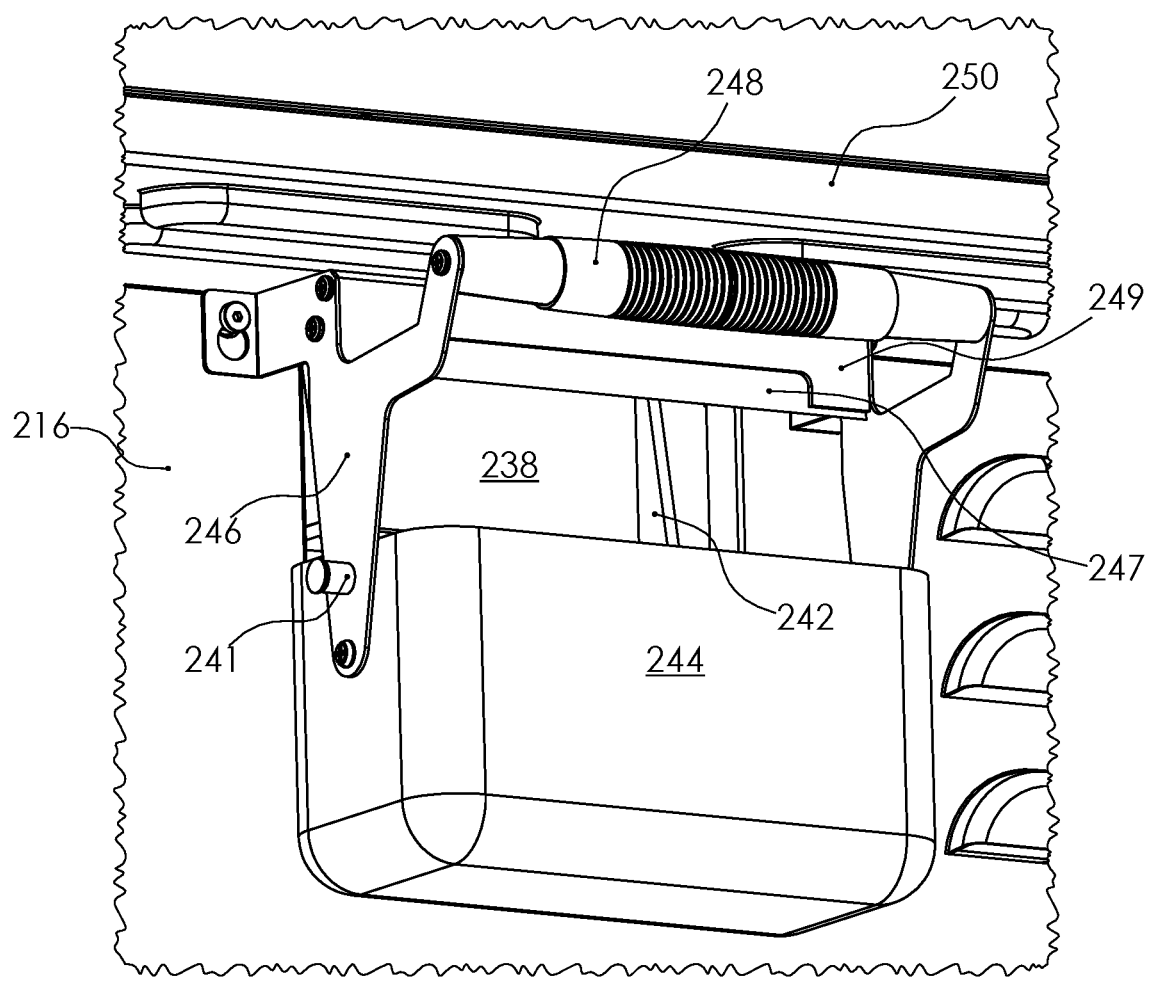
FIG. 5 is a perspective view of an installed grease receptacle portion of an outdoor gas griddle in accordance with embodiments of the invention.
Figure 6:
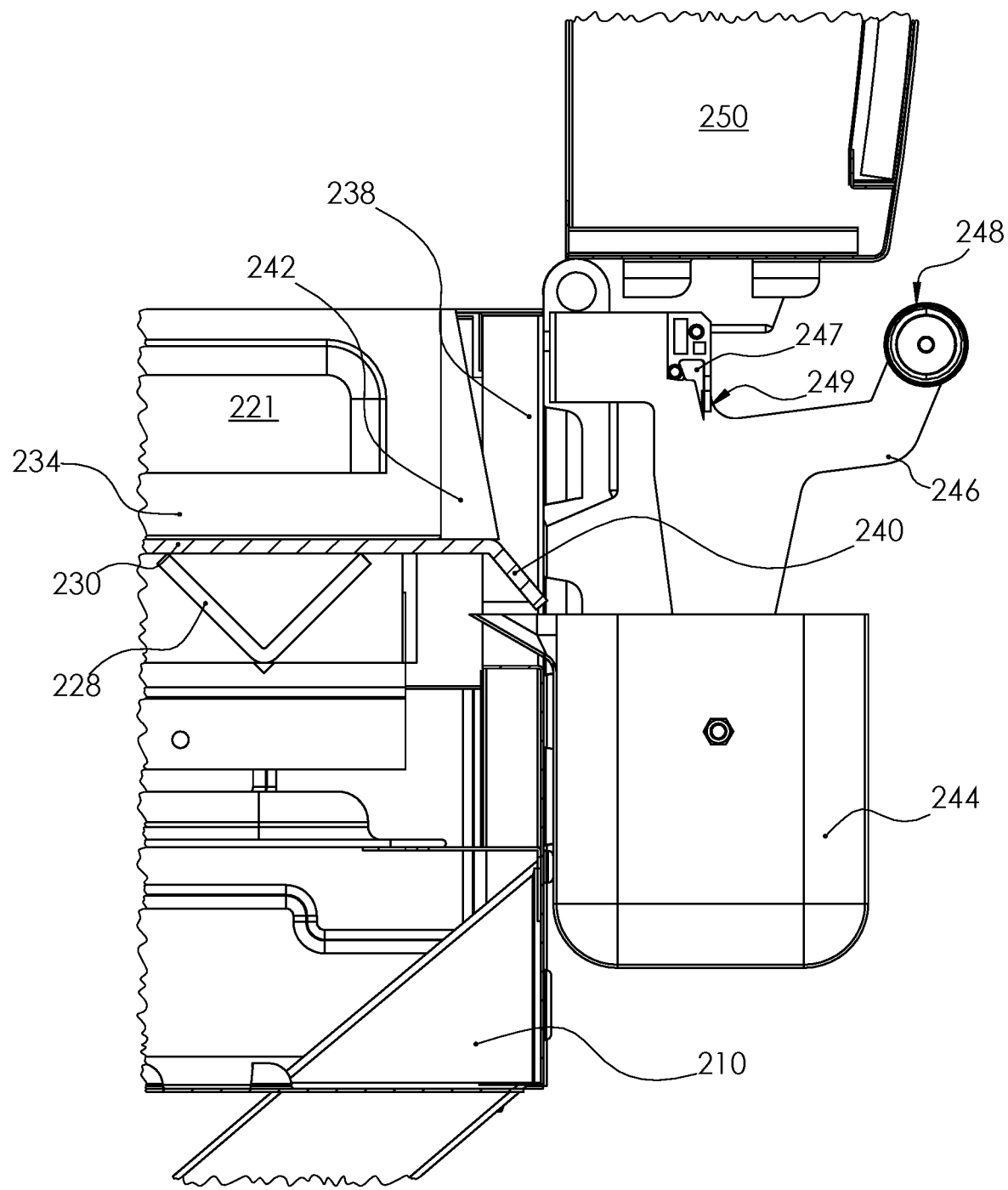
FIG. 6 is a cross-sectional side view of an installed grease receptacle portion of an outdoor gas griddle in accordance with embodiments of the invention.
Figure 7:
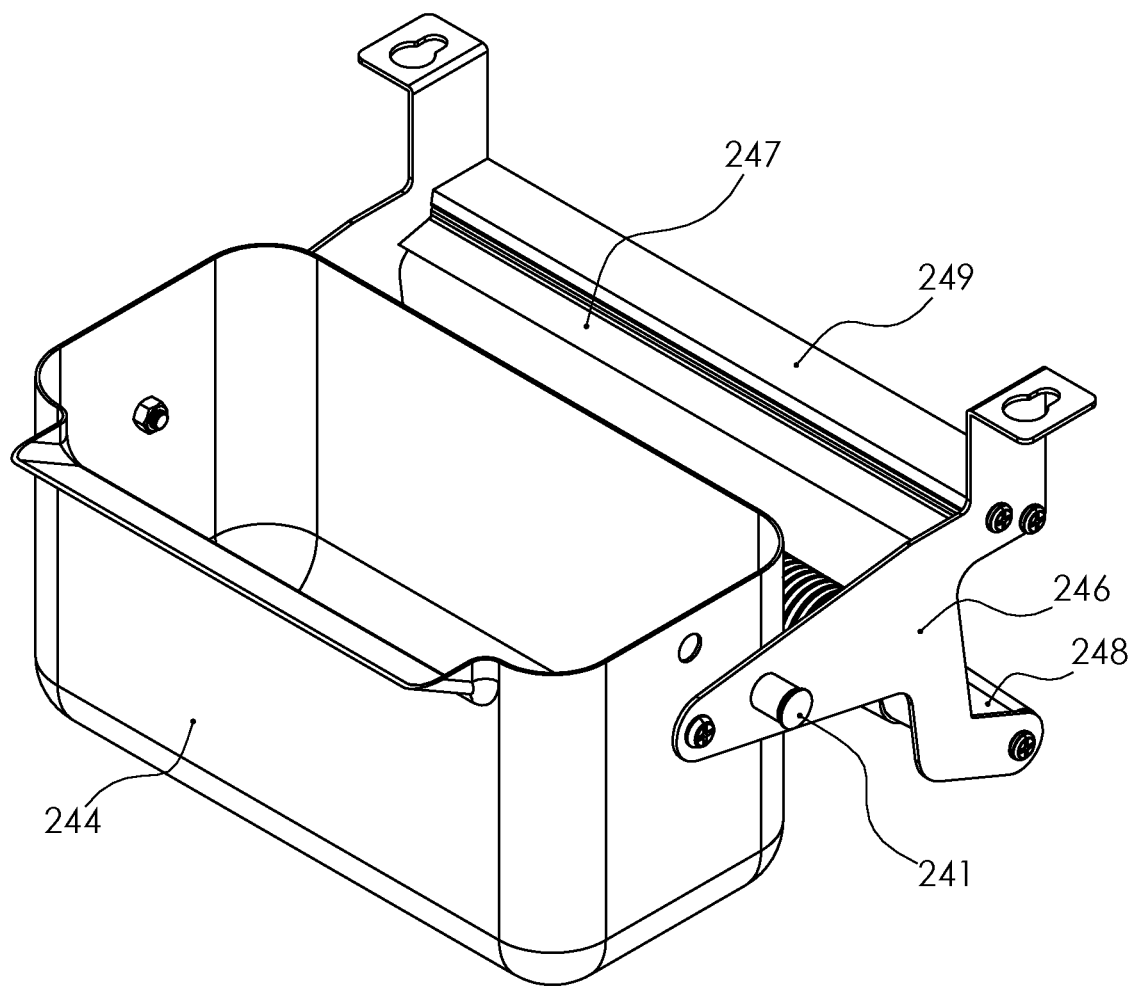
FIG. 7 is a perspective view of a grease receptacle with pivoted handle portion of an outdoor gas griddle in accordance with embodiments of the invention.

Reference will now be made in detail to embodiments of the present invention, examples of which are illustrated in the accompanying drawings. With reference to FIGS. 1, 2, 3 and 4, an outdoor gas griddle 10 may include a lower cart 100 and an upper head unit 200. The cart 100 may include a plurality of cart legs 110 joined by a cart base with fashioners, such as screws, bolts, cotter pins, or the like. The cart legs 110 may be provided with caster wheels 112 and wheel locks. The leg tops may be removably connected to the head unit 200. The size, shape, and design of the cart 100 may be varied without departing from the intended scope of the invention. For example, in alternative embodiments, the cart may include an enclosed cabinet for storage and/or esthetic purposes.

Figure 17:
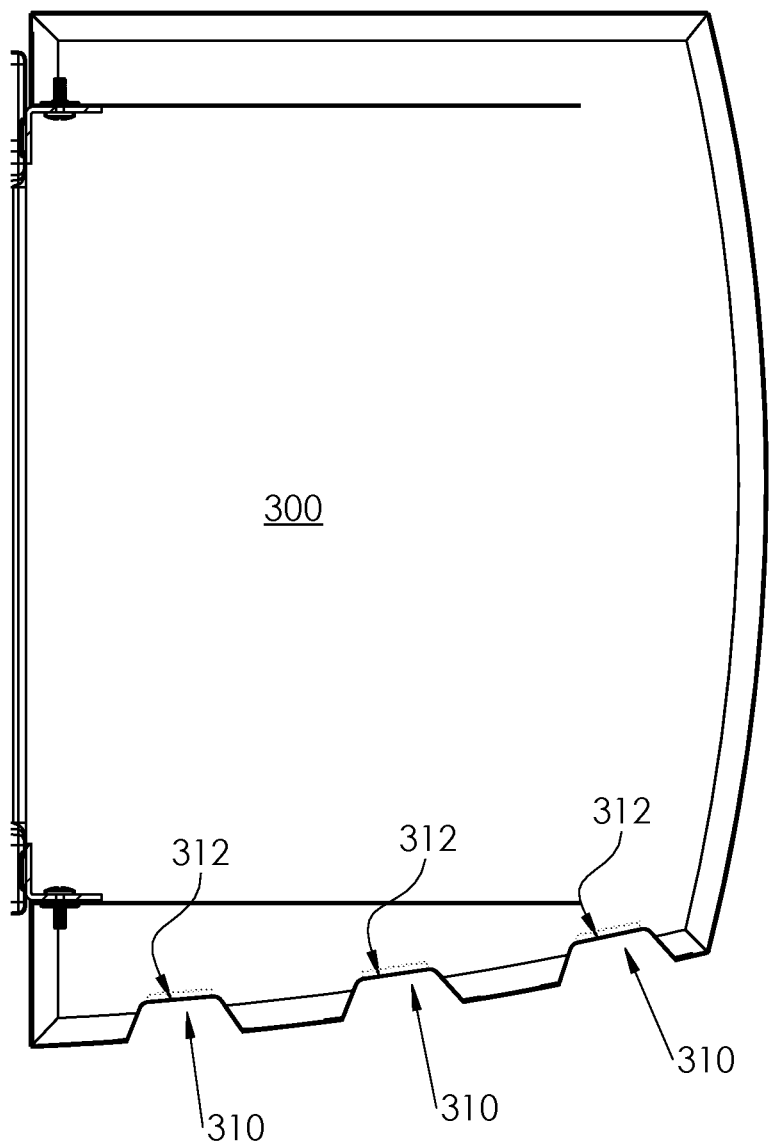
FIG. 17 is a top view of a side table portion of an outdoor gas griddle in accordance with embodiments of the invention.

The head unit 200 may include a griddle body 210 having a left side wall 212, and a right side wall 214, respectively. Side tables 300 may be connected to the griddle body 210 along the left and right side walls 212 and 214 by one or more brackets (not shown). With reference to FIG. 17, the side tables 300 may be spaced from the griddle body 210 by one or more spacers, which may be formed by embossments or separate elements. The side tables 300 may be provided with one or more scalloped recesses 310 with raised embossed interior surfaces 312. The embossments 312 may be provided with flat magnets on their inner surfaces so as to provide magnetic tool holders.

Figure 8:
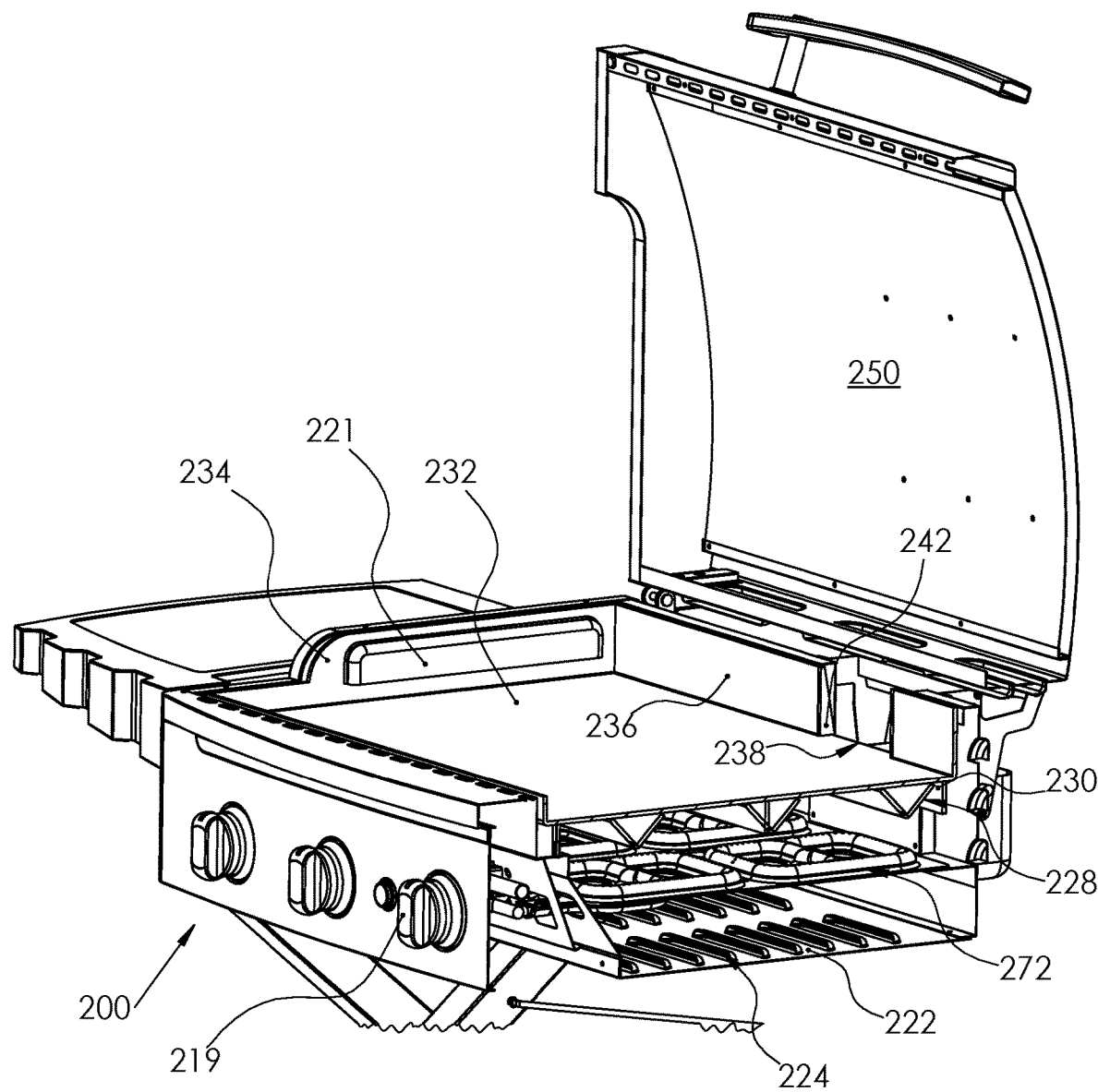
FIG. 8 is a cross-sectional perspective view of a upper portion of an outdoor gas griddle in accordance with embodiments of the invention.

With renewed reference to FIGS. 1, 2, 3 and 4, the front of the head unit 200 may include a control panel 218 having one or more control knobs 219. One or both sides of the cart 100 may include hardware used to hang and/or secure one or more propane gas tanks. A low profile lid 250 may form the top of the head unit 200 thereby selectively enclosing the griddle body 210 to form a cooking chamber. The lid 250 may include a handle 254 and lid sides 252. The lid 250 may be connected to the rear wall 216 of the griddle body 210 by a hinge assembly 260. The lid rear wall 256, the griddle body 210 rear wall 216, as well as the right side 214 and the left side 212 of the griddle body may include a plurality of side wall louvered vents 220. Similar louvered vents (shown in FIG. 8) may be provided along the griddle body bottom 222.

With reference to FIGS. 1-8, the griddle body 210 may also include a cooking surface 232 constructed of metal or other material. The cooking surface 232 may have one or more side walls 234 and a back wall 236 that contain grease and food on the cooking surface. A back wall opening 238 may be provided in the back wall 236. The back wall opening 238 may have an upper boundary formed only by the lid back wall 256. A downwardly angled portion of material may extend from a portion of the cooking surface 232 that extends through the back wall opening 238 to form a grease drip flange 240. Preferably, the upper precipice of the downward angled portion of material forming the grease drip flange 240 is measurably beyond the juncture of the cooking surface 232 and the back wall opening 238. Both sides of the portion of the cooking surface 232 that extends through the back wall opening 238 may be framed by flange supports 242 which also act as grease guides. Preferably, the grease drip flange 240 may be an integral part of the cooking surface 232.

With continued reference to FIGS. 1-8, in which like reference characters refer to like elements, grease may be contained by the combination of the cooking surface 232 and cooking surface side walls 234. Using a spatula or other utensil, such grease may be pushed to or through the back wall opening 238 of the cooking surface back wall 236 and over the grease drip flange 240 into a removable grease receptacle 244. The grease receptacle 244 may be provided with a hanger bracket 246 that removably connects the grease receptacle to the rear wall 216 of the griddle body 210. The grease receptacle 244 may have an upwardly angled lip along an upper edge that is adjacent to the rear wall 216. When the grease receptacle is properly installed, the upwardly angled lip may be provided directly below and overlap with the grease drip flange 240. Preferably, the lower most edge of the grease drip flange 240 is provided at or below the level of the upper most edge of the upwardly angled lip of the grease receptacle 244. Further, both the grease receptacle 244 and its upwardly angled lip may have a width that is greater than that of the grease drip flange 240 so that all grease that flows over the grease drip flange is captured in the grease receptacle.

The hanger bracket 246 may have a generally T-shape when viewed from the side. A first inner (relative to the griddle) top edge of the hanger bracket 246 may include extensions with teardrop shaped openings configured to receive mating posts extending away from the rear wall 216 on each side of the back wall opening 238. The extensions with teardrop shaped openings may be provided at both ends of a lateral member 249. Gravity maintains the grease receptacle in a secure position when the posts and teardrop shaped openings are engaged with each other. A replaceable squeegee blade 247, preferably constructed of silicone, may be disposed in a track provided along the lower surface of the lateral member 249 provided as part of the hanger bracket 246. The squeegee 247 and the supporting lateral bracket 249 therefor may provide surfaces used to scrap food and grease off of a cooking utensil. A second outer top edge of the hanger bracket 246 may include a handle 248 that extends between the two sides of the hanger bracket. The handle 248 may include heat insulating material. The handle 248 and the hanger bracket 246 may selectively pivot relative to the grease receptacle 244 as the result of a user controlling a locking pin assembly 241. A user may remove the grease receptacle 244 for emptying as follows. After closing the low profile lid 250, the user may either go to the back of the griddle or reach over the top of the lid, grasp the handle 248 and pull the entire grease receptacle assembly upward off of the mounting elements extending from the rear wall 216. The user may selectively unlock the locking pin assembly 241 to swivel the grease receptacle 244 relative to the hanger bracket 246 to empty the contents of the grease receptacle into a larger refuge container.

Figure 11:
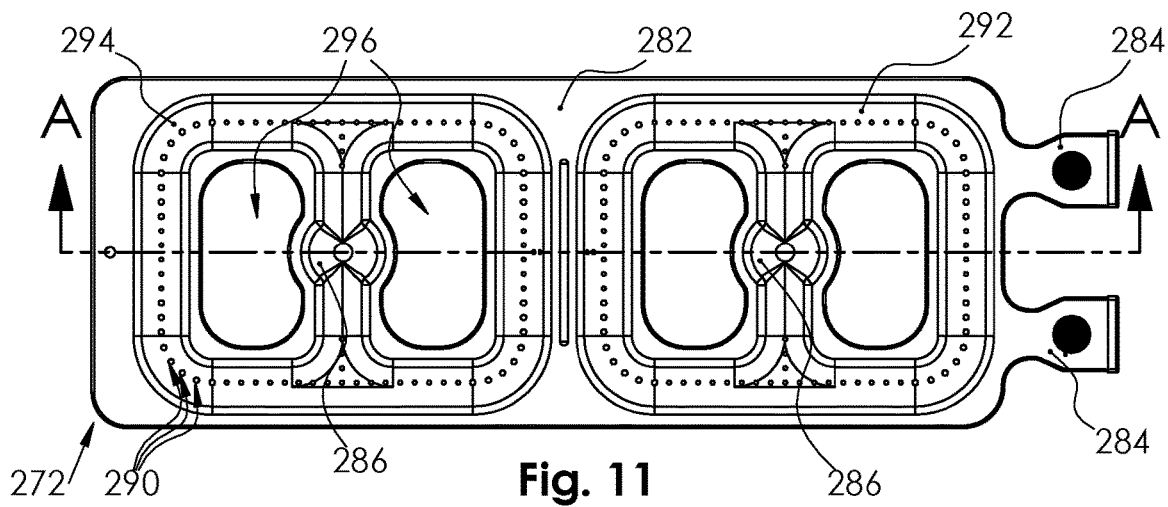
FIG. 11 is a top plan view of a burner assembly of an outdoor gas griddle in accordance with embodiments of the invention.
Figure 12:
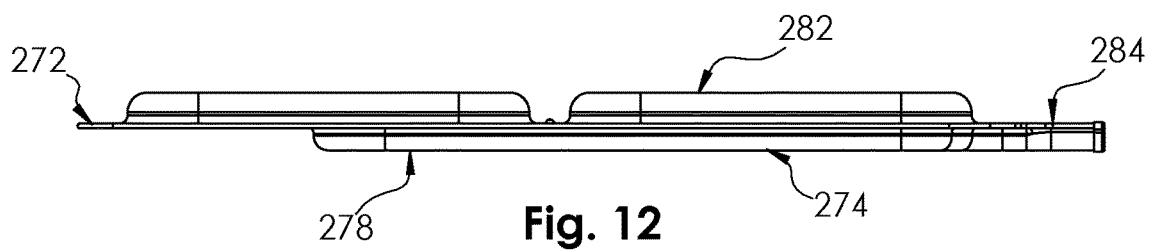
FIG. 12 is a side view of a burner assembly of an outdoor gas griddle in accordance with embodiments of the invention.
Figure 13:
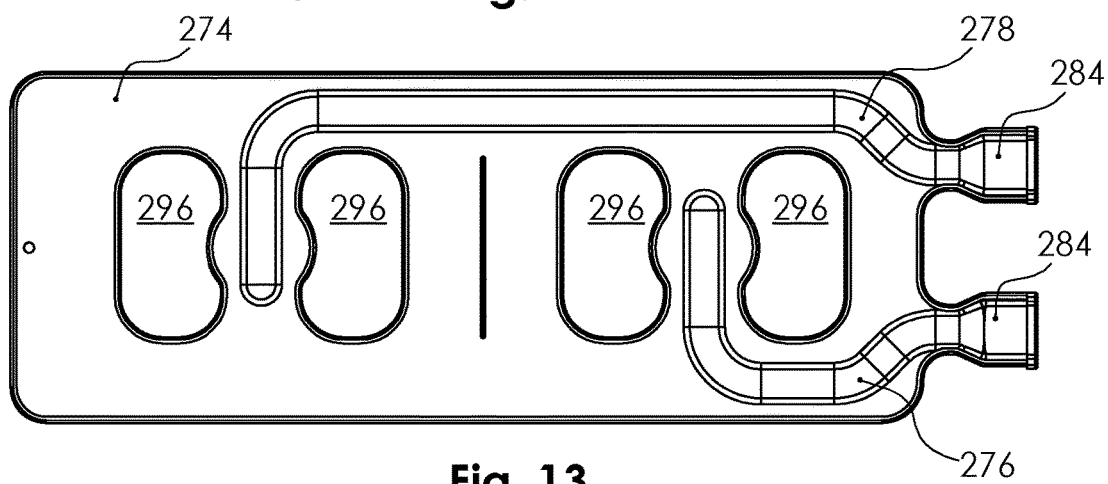
FIG. 13 is a top plan view of burner bottom portion of an outdoor gas griddle in accordance with embodiments of the invention.
Figure 14:
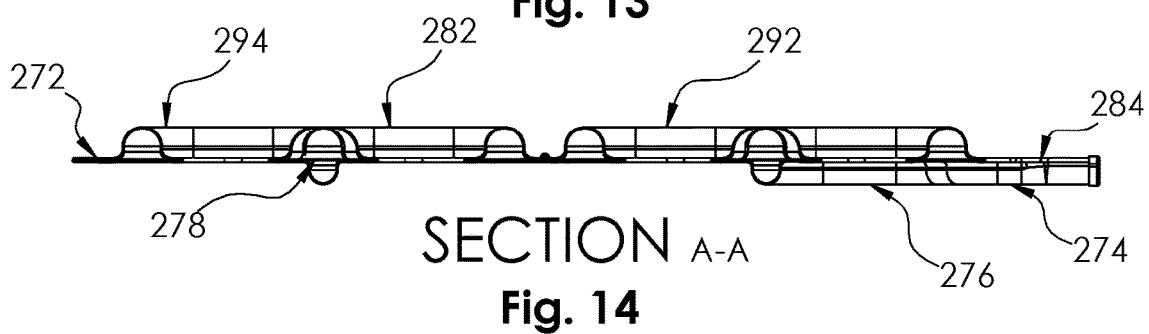
FIG. 14 is a cross-sectional view of the burner assembly of FIG. 11 taken along cut line A-A.
Figure 15:
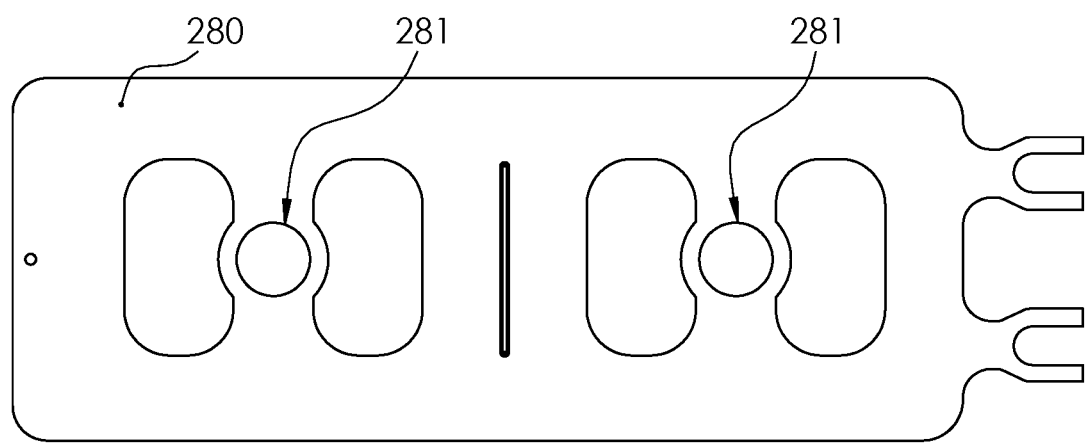
FIG. 15 is a top plan view of an optional baffle plate that may be used for an outdoor gas griddle in accordance with embodiments of the invention.

With reference to FIGS. 9 and 11-16, heat may be generated for the griddle 10 by four burner assemblies 272, although the scope of the invention includes griddles with more, or less, than four burner assemblies. FIG. 11 illustrates a single burner assembly 272 having a ring-shaped front burner 292 and a ring-shaped rear burner 294 that are independently controllable. Each ring-shaped burner 292 and 294 may be formed by an embossing process. With reference to FIGS. 11-14, each burner assembly 272 may be formed by the combination of a burner bottom 274 (shown in FIGS. 12-14) and a burner top 282. The burner bottom 274 may include a burner bottom front venturi 276 and a burner bottom rear venturi 278. Each venturi may be formed in the burner bottom as a result of embossing a sheet of material, such as steel, and sealing the embossed portion so as to form isolated passages relative to each other. The front venturi 276 may receive propane or natural gas at a first input port and supply the gas to the front burner 292. The rear venturi 278 may receive propane or natural gas at a second input port and supply the gas to a rear burner 294. With reference to FIGS. 11-15, an optional baffle plate 280 may isolate the burner bottom 274 from the burner top 282 with the exception of baffle plate openings 281. The baffle plate openings 281 allow gas to flow from the front venturi 276 and the rear venturi 278 in the burner bottom 274 to the venturi caps 286 provided in the burner top 282. Gas may flow from the venturi caps 286 to the front burner 292 and the rear burner 294, respectively. Preferably, the baffle plate 280 can be incorporated into the burner top 282. Ports 290 in the front and rear burners 292 and 294 emit the gas so that it can be combusted along the outside surface of the front and rear burners. An elongated emboss may isolate the front burner 292 from the rear burner 294. The burner top 282 may have an outer perimeter that is crimped over the baffle plate 280 and the burner bottom 274 to form a single burner assembly 272. The burner top 282 may include venturi cover portions 284 that are also sealed to the baffle plate 280 and burner bottom 274. Openings 296 may be formed in the final burner assembly 272.

Figure 9:
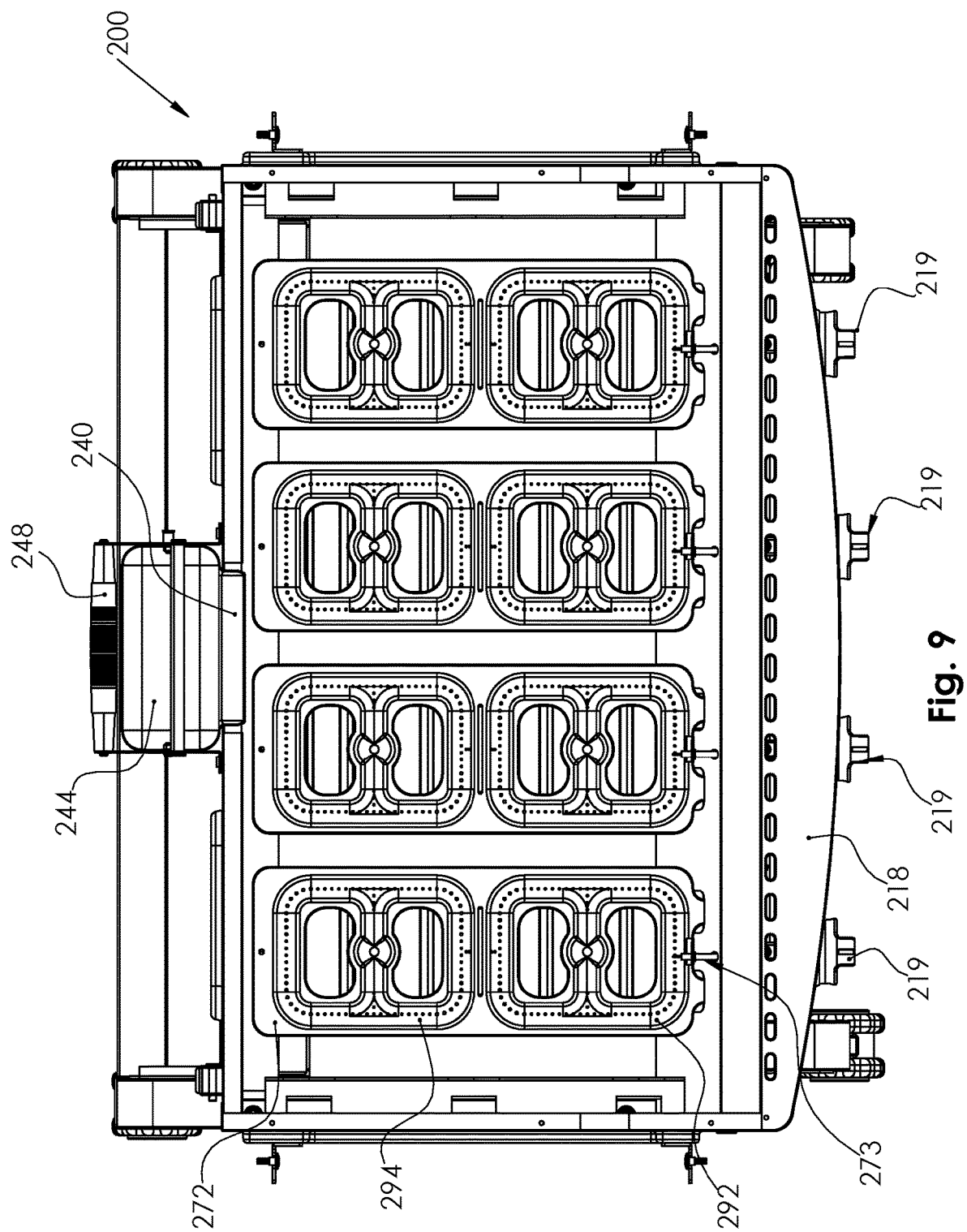
FIG. 9 is a cross-sectional top view of the head unit of an outdoor gas griddle including burner assemblies providing eight (8) individual cooking zones in accordance with embodiments of the invention.
Figure 10:
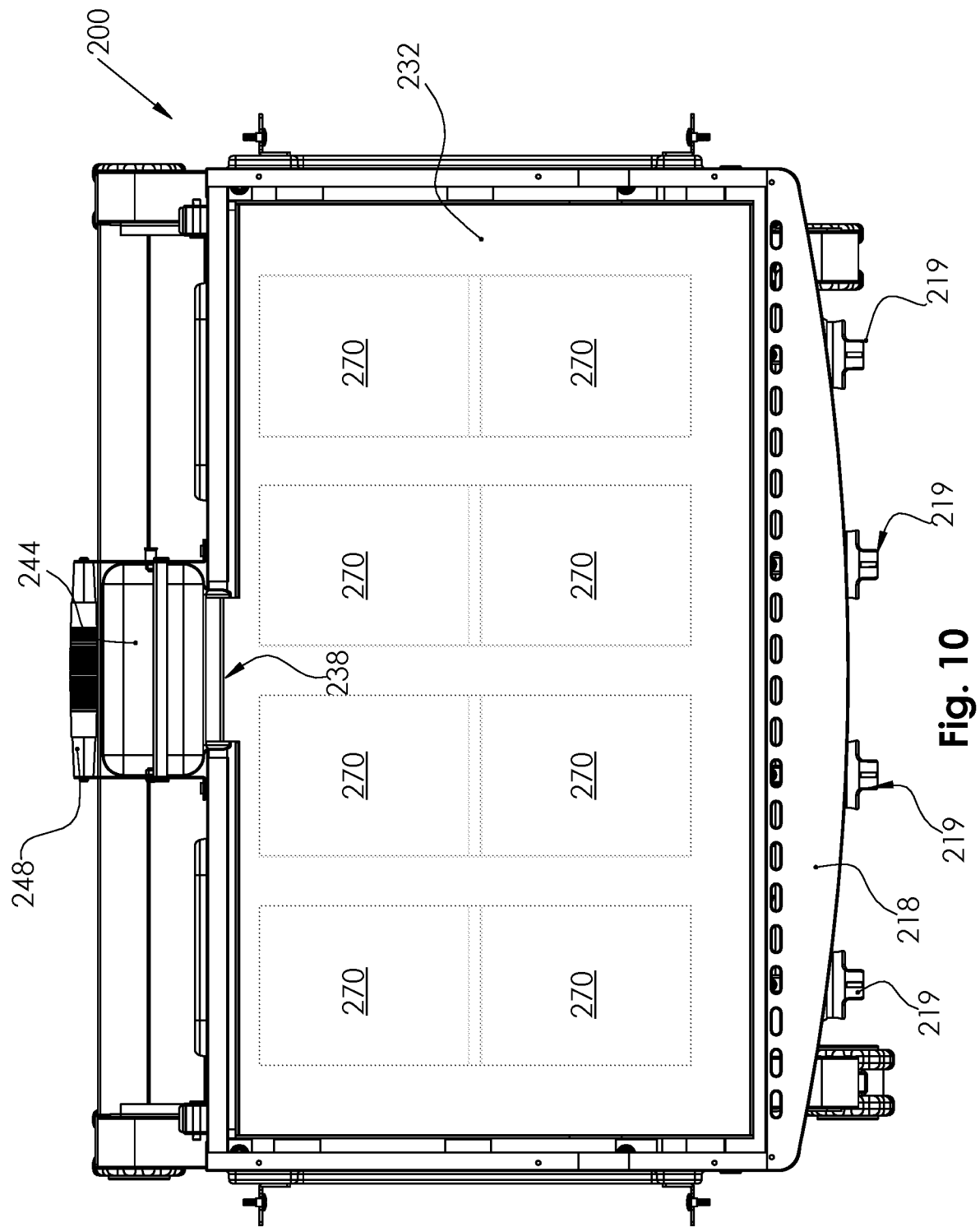
FIG. 10 is a top view of the head unit of an outdoor gas griddle including burner assemblies providing eight (8) individual cooking zones in accordance with embodiments of the invention.

With reference to FIGS. 9 and 10, an overhead view of the griddle head unit 200 is provided. The grease receptacle 244 and associated handle 248 are provided adjacent to the back wall opening 238 and the grease drip flange 240. By using four burner assemblies 272, each including a front burner 292 and a rear burner 294, the cooking surface 232 may be provided with eight independently controllable cooking zones 270. Each control knob 219 may be connected to a dual gas valve having an associated spark ignitor 273. The control knob 219 and dual gas valves may be configured to: (i) provide only the front burner with High heat, (ii) provide both the front burner and the rear burner with High heat, (iii) provide both the front burner and the rear burner with Medium heat, or (iv) provide both the front burner and the rear burner with Low heat. It is appreciated that other combinations of front and rear burner heat settings may be provided without departing from the intended scope of the invention.

Figure 16:
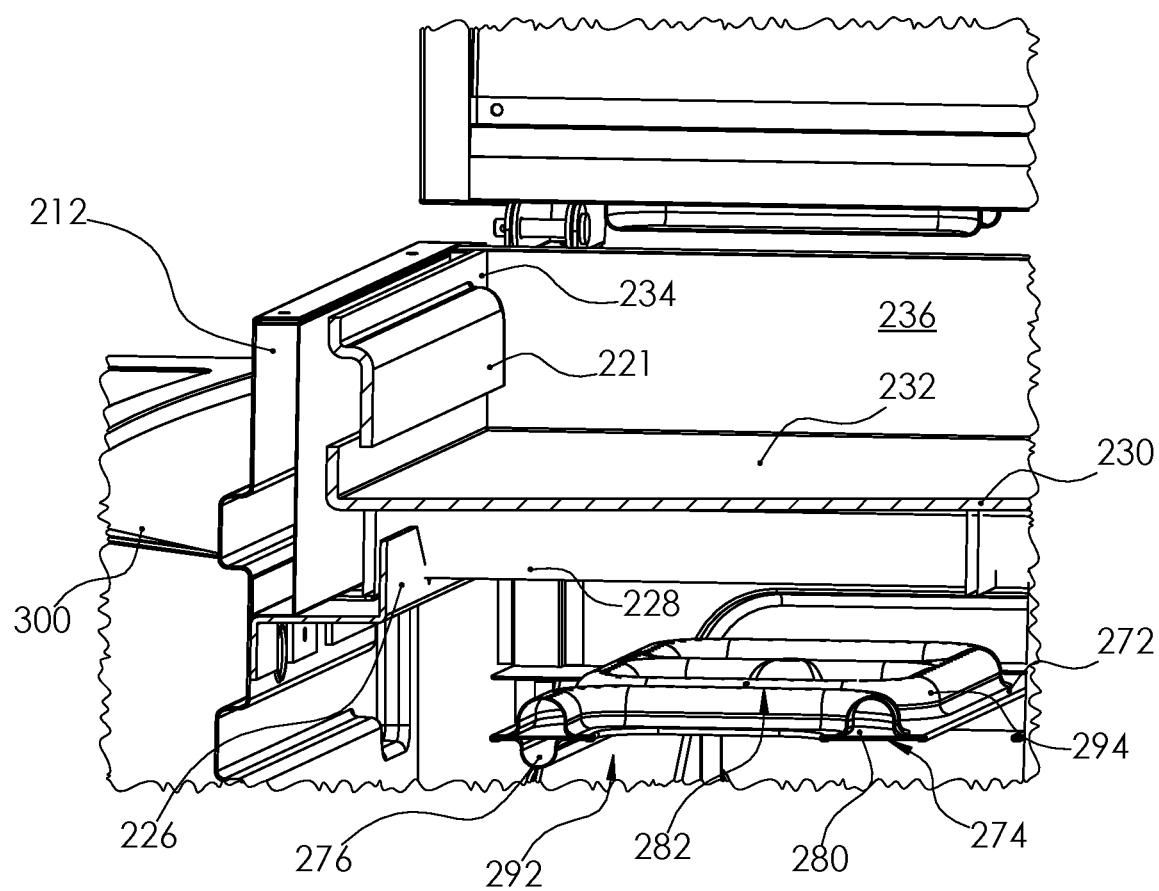
FIG. 16 is a cut-away perspective view of a portion of the head unit of an outdoor gas griddle in accordance with embodiments of the invention.

With reference to FIG. 16, the arrangement of the burner assembly 272, the cooking surface 232, and the side table 300 is illustrated. The left side wall 212 is connected to the cooking surface side wall 234, which may be provided with one or more elongated, downwardly directed louver style surface vents 221. The surface vents 221 may redirect heat captured in the griddle side walls back towards the cooking surface 232. Underneath the cooking surface 232, the side brackets 226 may include notches configured to receive V-supports 228 that support the griddle plate 230. The griddle plate 230 may be a separate element from the cooking surface 232, or the two elements may be formed from a single material piece. The side brackets 226 may be disposed in close proximity to a plurality of burner assemblies, described above. The burner assemblies 272, including front burner 292 and rear burner 294, may be provided underneath the V-supports 228. The burner top 282 and burner bottom 274 are shown to sandwich the optional baffle plate 280, thereby isolating the front venturi 276.

As will be understood by those skilled in the art, the invention may be embodied in other specific forms without departing from the spirit or essential characteristics thereof. The elements described above are provided as illustrative examples for implementing the invention. One skilled in the art will recognize that many other implementations are possible without departing from the present invention as recited in the claims. Accordingly, the disclosure of the present invention is intended to be illustrative, but not limiting, of the scope of the invention. It is intended that the present invention cover all such modifications and variations of the invention, provided they come within the scope of the appended claims and their equivalents.

What is claimed:

1. A cooking griddle, comprising:
   a flat continuous cooking surface;
   a plurality of control knobs provided adjacent to the cooking surface;
   a plurality of dual gas valves, wherein each of the plurality of dual gas valves is operatively connected to, and associated with, a single one of each of the plurality of control knobs;
   a plurality of burner assemblies, wherein each of the plurality of burner assemblies is operatively connected to a single one of each of the plurality of dual gas valves, and wherein each of the plurality of burner assemblies comprises:
   a first gas input port communicating with a front venturi, which in turn communicates with a ring-shaped front burner; and
   a second gas input port communicating with a rear venturi, which in turn communicates with a ring-shaped rear burner,
   wherein each one of the plurality of control knobs and an associated one of the plurality of dual gas valves is configured to simultaneously selectively provide a first supply of gas for operating the ring-shaped front burner and a second supply of gas for operating the ring-shaped rear burner at different levels of preselected heat selected from the group consisting of: a low level of heat, a medium level of heat, and a high level of heat, and
   wherein the front venturi communicates with a first venturi cap opening at the center of the ring-shaped front burner; and
   the rear venturi communicates with a second venturi cap opening at the center of the ring-shaped rear burner.

2. The cooking griddle of claim 1, wherein each of the plurality of burner assemblies comprises:
   a metal burner bottom element having a first embossed passage that provides the front venturi and a second embossed passage that provides the rear venturi; and
   a metal burner top element sealed to the metal burner bottom element, said metal burner top element having a third embossed passage that provides a front burner that is configured to receive gas from the front venturi and not receive gas from the rear venturi, and said metal burner top element having a fourth embossed passage that provides a rear burner that is configured to receive gas from the rear venturi and not receive gas from the front venturi.

3. The cooking griddle of claim 2, further comprising:
first and second open areas formed in each of the plurality of burner assemblies on opposite sides of the first venturi cap opening; and
third and fourth open areas formed in each of the plurality of burner assemblies on opposite sides of the second venturi cap opening.

4. The cooking griddle of claim 3, wherein:
the first and second open areas define passages that connect the first venturi cap opening with a first loop of embossed passage having gas ports formed therein, and
the third and fourth open areas define passages that connect the second venturi cap opening with a second loop of embossed passage having gas ports formed therein.

5. The cooking griddle of claim 4, wherein:
the ring-shaped front burner of each of the plurality of burner assemblies provides a first heating zone on the cooking surface,
the ring-shaped rear burner of each of the plurality of burner assemblies provides a second heating zone on the cooking surface, and
the griddle is configured to continuously provide different levels of heat for the first heating zone and the second heating zone.

6. The cooking griddle of claim 1, further comprising:
first and second open areas formed in each of the plurality of burner assemblies; and
third and fourth open areas formed in each of the plurality of burner assemblies,
wherein the first and second open areas define passages that connect to a first loop of embossed passage having gas ports formed therein, and
wherein the third and fourth open areas define passages that connect to a second loop of embossed passage having gas ports formed therein.

7. The cooking griddle of claim 1, wherein:
the ring-shaped front burner of each of the plurality of burner assemblies provides a first heating zone on the cooking surface,
the ring-shaped rear burner of each of the plurality of burner assemblies provides a second heating zone on the cooking surface, and
the griddle is configured to continuously provide different levels of heat for the first heating zone and the second heating zone.

* * * * *